United States Patent [19]
Berkus

[11] 3,993,378
[45] Nov. 23, 1976

[54] BATTERY HOUSING

[76] Inventor: Clyde C. Berkus, 3467 Red Rose Drive, Encino, Calif. 91361

[22] Filed: June 4, 1975

[21] Appl. No.: 583,536

[52] U.S. Cl. ............................. 312/293; 180/68.5; 292/119; 248/499; 248/505; 24/204; 312/242; 312/330 R; 312/351; 296/24 R; 248/503

[51] Int. Cl.² .................. B60R 68/02; B60R 11/00; H01M 2/10

[58] Field of Search .................... 312/242, 245, 351; 180/351, 68.5; 248/206, 361; 24/204

[56] References Cited
UNITED STATES PATENTS

| | | | |
|---|---|---|---|
| 2,104,768 | 1/1938 | Saunders | 180/68.5 |
| 2,584,274 | 2/1952 | Laystrom et al. | 312/242 |
| 3,008,785 | 11/1961 | Gehrs | 312/242 |
| 3,414,093 | 12/1968 | Chostner | 24/204 |
| 3,861,703 | 1/1975 | Gould | 24/204 |
| 3,894,607 | 7/1975 | Brock | 180/68.5 |

Primary Examiner—Casmir A. Nunberg
Attorney, Agent, or Firm—Keith D. Beecher

[57] ABSTRACT

A housing for an auxiliary storage battery is provided which may be fitted into the wall of a camper. The housing is formed of plastic material, and it is of an integral, impervious construction, so that no fumes from the storage battery can enter the interior of the camper. The housing is equipped with a slidable shelf to permit the battery to be pulled out through the open front of the housing for servicing or replacement purposes. A removable hinged door is provided which is vented to permit air circulation through the housing, and a lock and other fastening means are provided to hold the door in a closed position.

4 Claims, 7 Drawing Figures

BATTERY HOUSING

BACKGROUND OF THE INVENTION

The housing of the invention provides a convenient means for storing a storage battery in a camper, the battery serving as an auxiliary electrical source for illuminating the camper and for energizing electrical appliances. The battery itself may be connected to the electrical system of the associated motor vehicle for recharging purposes.

The housing of the invention permits convenient external access to the battery, permitting it to be serviced, and replaced when necessary. The housing itself is of an impervious integral construction, as mentioned above, and it is relatively low in cost and is relatively easy to install.

DETAILED DESCRIPTION OF THE ILLUSTRATED EMBODIMENT

Figure 1:
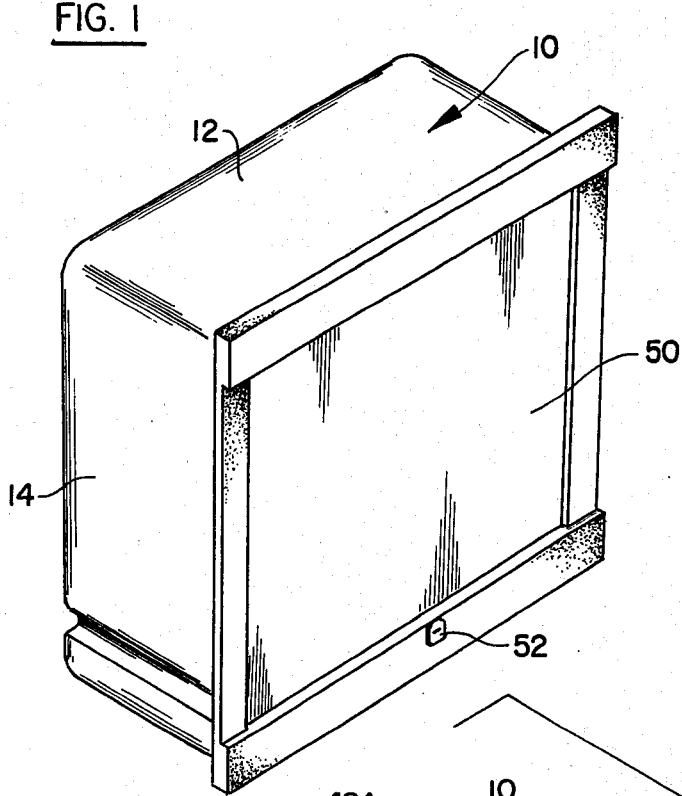
FIG. 1 is a perspective view of the housing showing the door in a closed and locked position.

The housing of the invention is intended to be inserted into an opening formed in the side wall of a camper, or the like, and mounted in place, to extend into the interior of the camper through the opening in the side wall. The housing itself, as mentioned above, is integrally formed of impervious plastic material, so that no fumes from the storage battery can enter the interior of the camper. The housing, as shown in the drawings is indicated generally as 10, and it includes a top wall 12, side walls 14 and 15, a bottom 16, a rear wall 18, and an open front.

A pair of integral ribs 20 and 22 are formed in the side walls 14 and 15, and are displaced slightly upwardly from the bottom 16. A shelf 24 is slidably supported on the bottom 16 by a plurality of integral vanes 26, directly under the ribs 20, 22.

A storage battery 28 is supported on the shelf 24, and is held in place by an appropriate strap 30 which is supported over the battery by a pair of bolts 32, 34.

A bracket 40 is mounted centrally on the bottom wall 16 toward the front edge thereof, and it is engaged by a pair of foreshortened vanes 26A when the shelf 24 is pulled out through the front of the housing to an open position, so as to limit the forward movement of the shelf.

A flange 42 is formed around the open front of the housing 10, and the flange defines a lip 42A along its upper edge. The side, top, bottom and rear walls of the housing 10 are formed integral with one another, and with the flange 42, of any appropriate impervious plastic material, as mentioned above.

Figure 2:
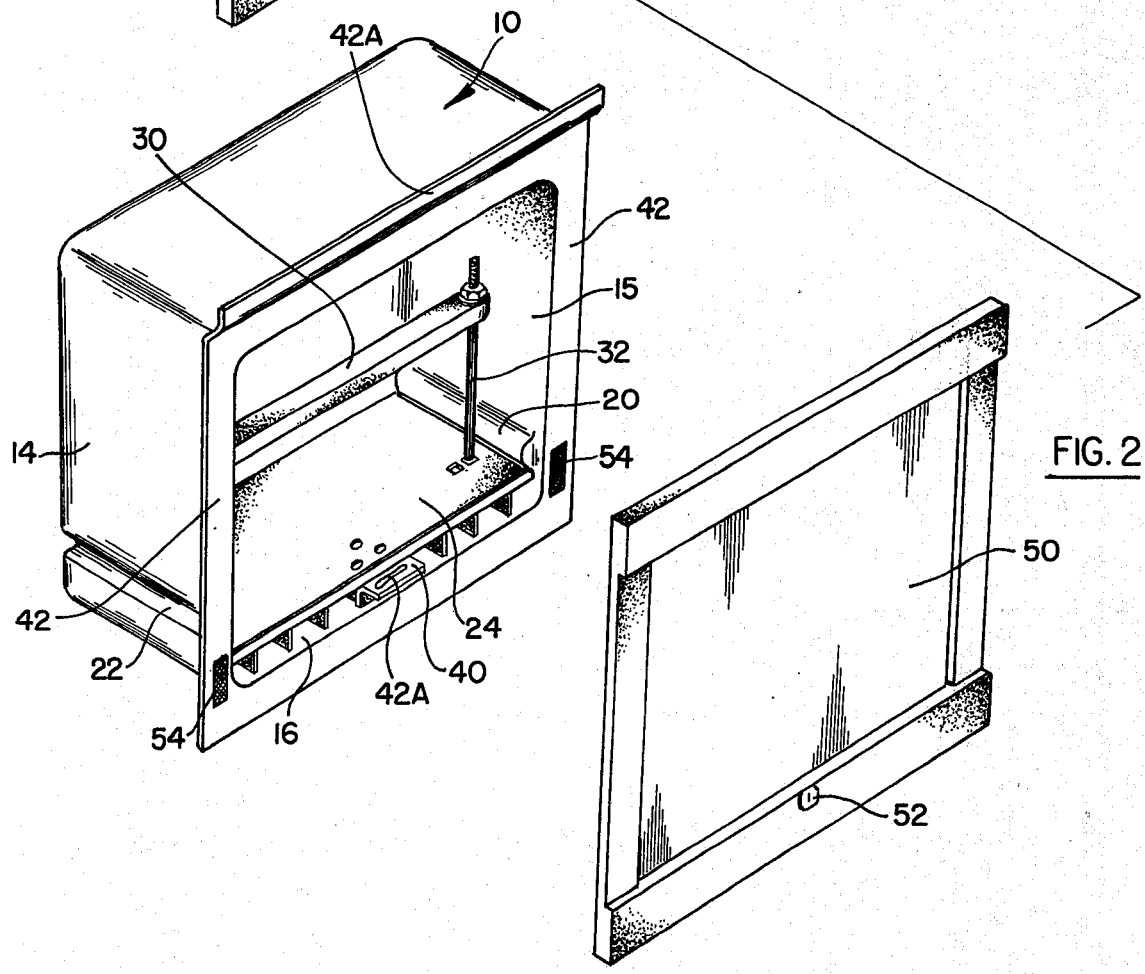
FIG. 2 is a view like FIG. 1, but with the door removed and displaced from the open front of the housing.
Figure 3:
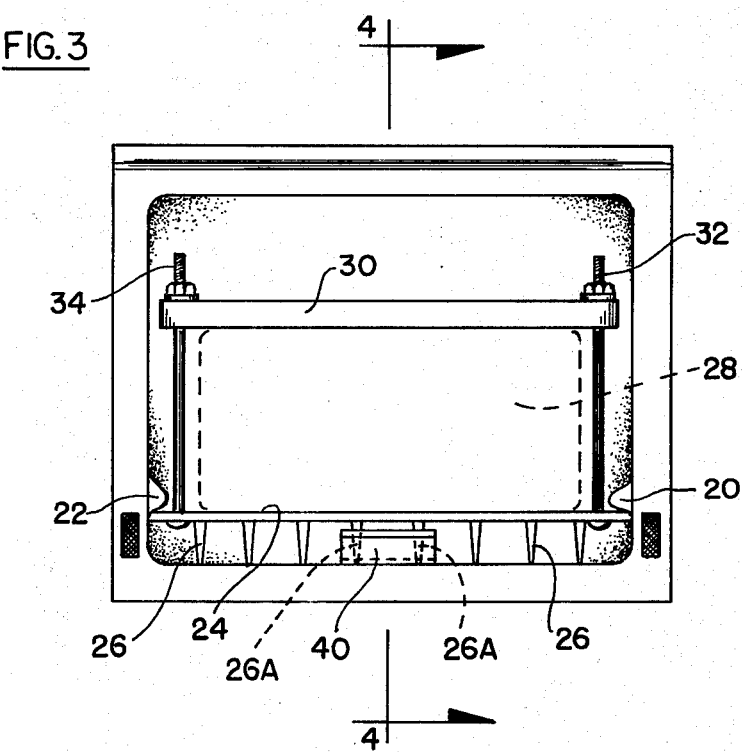
FIG. 3 is a front view of the housing with the door removed.
Figure 4:
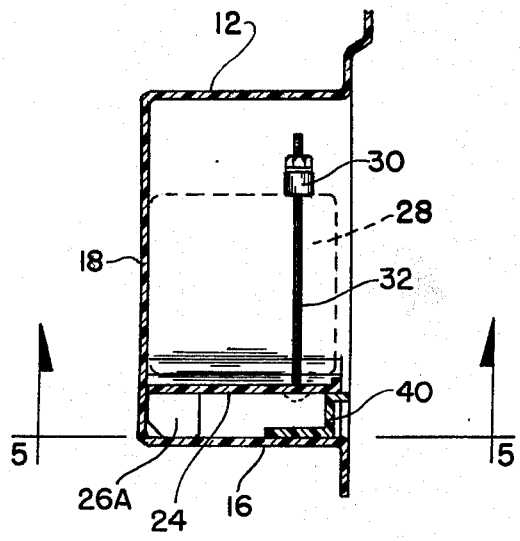
FIG. 4 is a section taken along the line 4—4 of FIG. 3.
Figure 5:
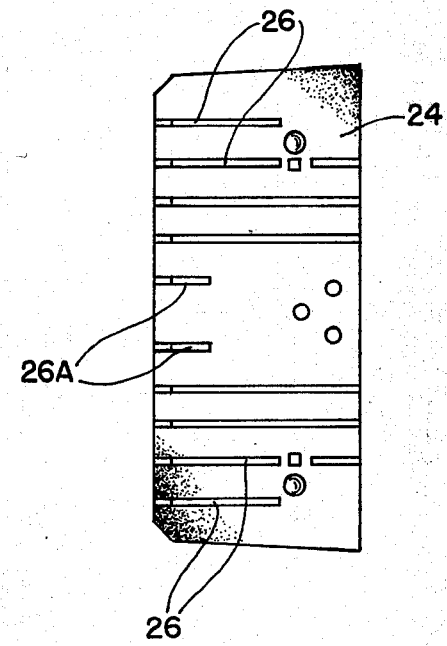
FIG. 5 is a bottom view of a slidable shelf member which is supported in the housing, and taken essentially along the line 5—5 of FIG. 4.
Figure 6:
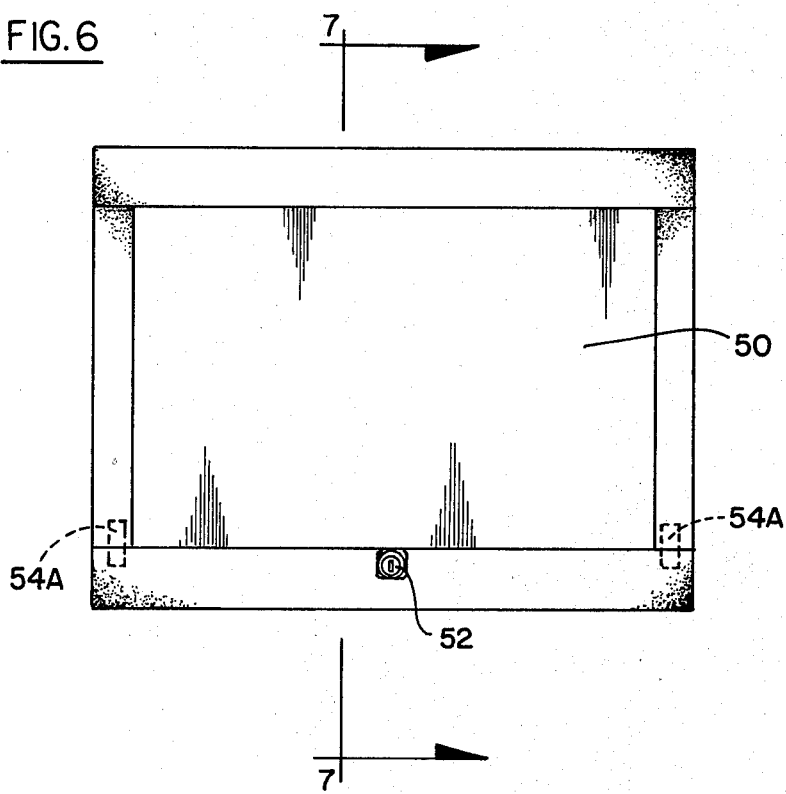
FIG. 6 is a front view of the door.
Figure 7:
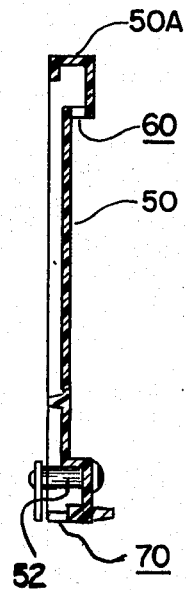
FIG. 7 is a section taken along the line 7—7 of FIG. 6.

A door 50 has a hook-shaped upper edge 50A (FIG. 7) which hooks over the lip 42A when the door is in its closed position of FIG. 1. However, the door can be turned up about the upper lip and removed, as shown in FIG. 2, to permit access to the interior of the housing. The shelf 24 can then be moved out to the limits permitted by the bracket 40 and vanes 26A to permit access to the battery 28.

The door 50 has a lock 52 on its lower edge which releasably engages a slot in the bracket 40, the slot being designated 40A.

Strips of Velcro, designated 44 may be mounted on the lower side edges of the flange 42 to engage mating strips 54A on the door 50, so that the door may be held tightly closed, when in its locked position.

The door has vents 60 formed in its upper edge, and 70 formed in its lower edge, so that a circulation of air passes through the interior of the housng to remove fumes generated by the storage battery.

The invention provides, therefore, an improved inexpensive housing for an auxiliary storage battery which may conveniently be mounted in a camper, or the like.

While a particular embodiment has been shown and described, modifications may be made. It is intended in the claims to cover the modifications which come within the spirit and scope of the invention.

What is claimed is:

1. A housing for a storage battery to be mounted in a camper, or the like, comprising: a rectangular casing having an open front and formed of impervious plastic material to have integral bottom, top, side and rear walls, said casing having integral ribs respectively formed on the inner surfaces of the side walls thereof and said ribs being displaced up from said bottom wall, said casing forming hinge means on the upper edge of said open front; a battery shelf; a plurality of upright vanes positioned in spaced parallel relationship under the shelf slidably to support the shelf on the bottom wall of the casing under the ribs to permit the shelf to be movable out through the open front of the casing; bracket means formed on the bottom wall of the casing in position to be engaged by selected ones of the vanes for limiting the movement of the shelf through the open front of the casing; means including a strap mounted on the shelf for supporting a storage battery on the shelf; and a removable door hanging in hinged relationship with the casing on said hinge means.

2. The housing defined in claim 1, in which said door has venting apertures formed therein.

3. The housing defined in claim 1, and which includes a locking means releasably coupling the door to the bracket means.

4. The housing defined in claim 1, and which includes Velcro members mounted on the door and on the housing for releasably holding the door in a closed position against the open front of the housing.